Figure 1:
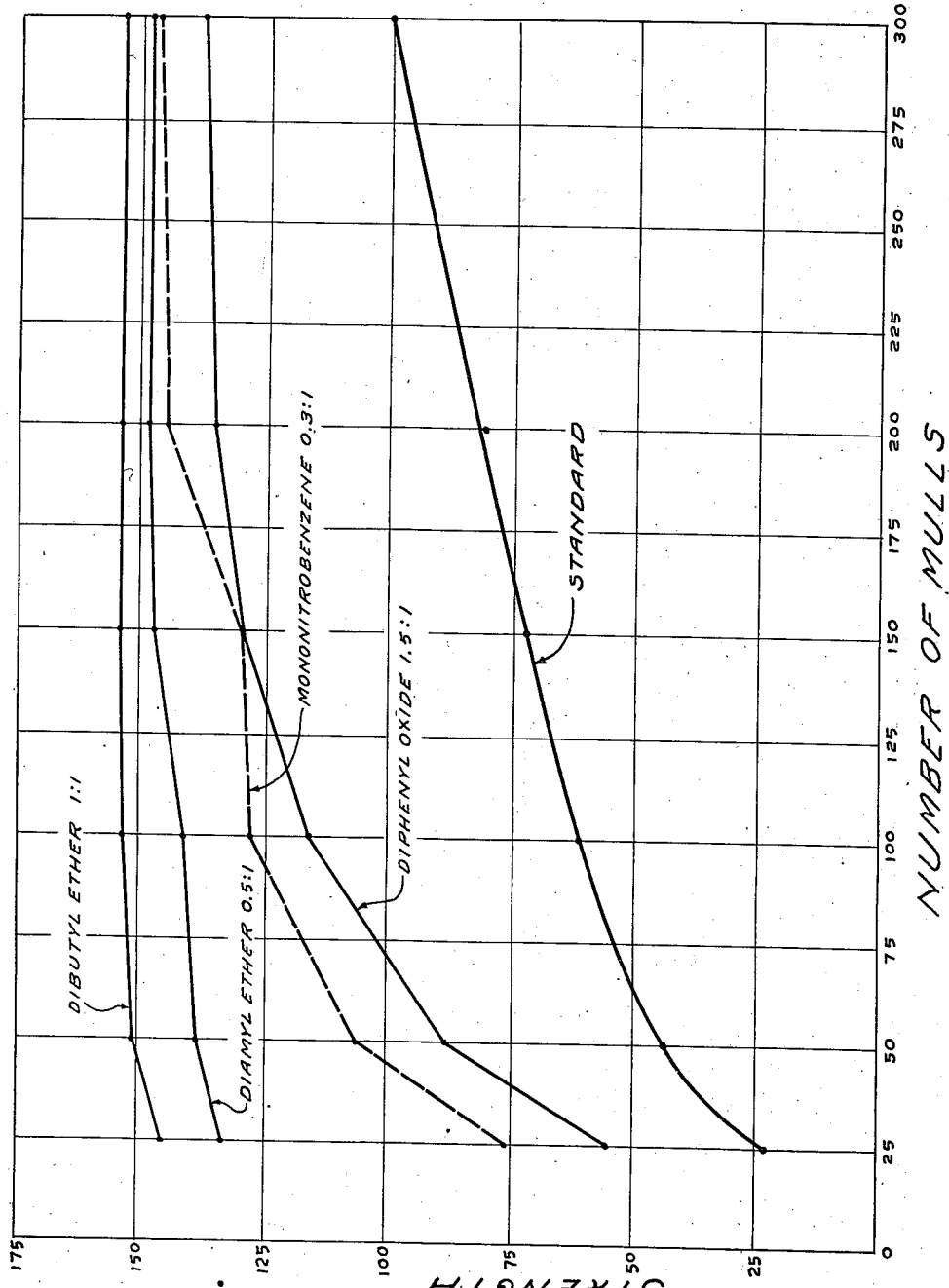

Oct. 10, 1944.  H. T. LACEY ET AL  2,359,737
CONDITIONING OF PIGMENTS
Filed Nov. 8, 1941  3 Sheets-Sheet 1

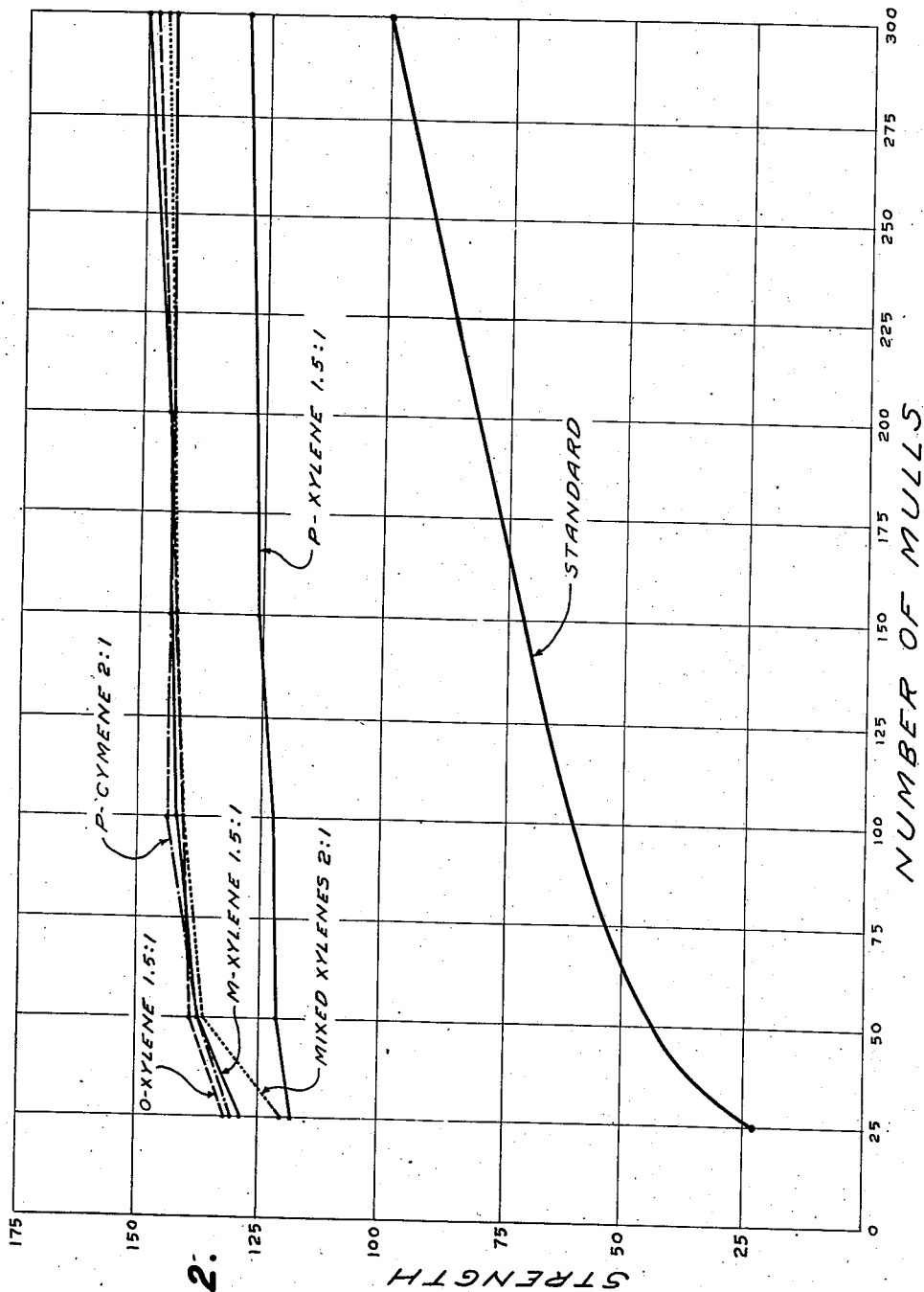

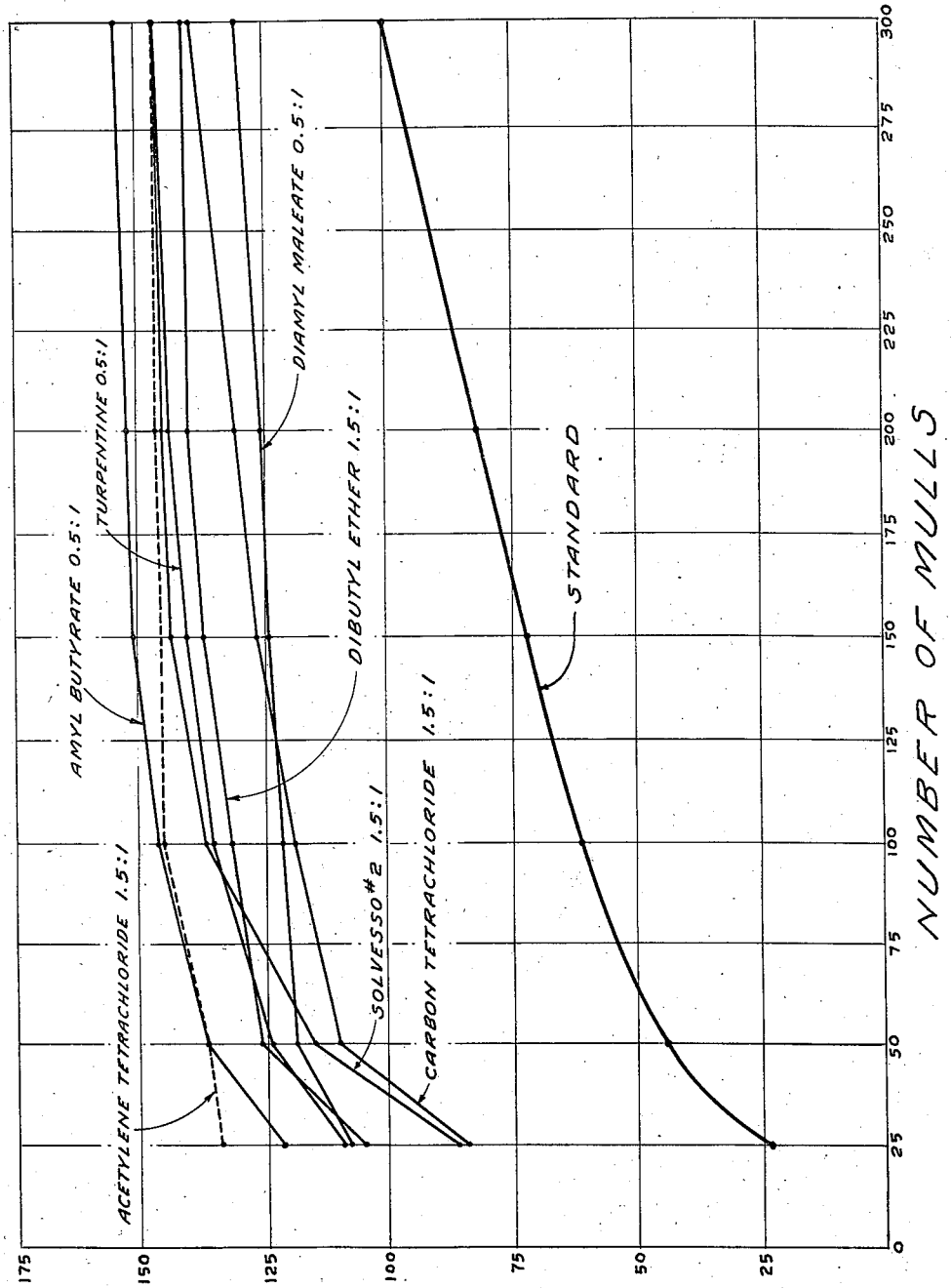

Patented Oct. 10, 1944

2,359,737

UNITED STATES PATENT OFFICE 2,359,737

CONDITIONING OF PIGMENTS

Harold Talbot Lacey and Hans Z. Lecher, Plainfield, N. J., assignors to American Cyanamid Company, New York, N. Y., a corporation of Maine Application November 8, 1941, Serial No. 418,301

20 Claims. (Cl. 260—314.5)

This invention relates to a process of improving the physical properties of porphine pigments soluble in concentrated sulfuric acid; and more particularly to the improvement in the physical properties of pigments of the phthalocyanine type.

Phthalocyanine and similar metal and metal-free pigments of the porphine and particularly the tetra-azo porphine series have been subjected to the so-called acid pasting method in order to increase the fineness of division and hence the color strength. This method involves solution of the pigment in a strong sulfuric acid solution followed by precipitation by an aqueous medium such as water or dilute sulfuric acid. Strictly speaking, this is not a pasting process as actual solution of the pigment takes place; however, it is referred to as acid-pasting in the art.

In spite of the increased strength which is obtainable by acid pasting, the porphine pigments are open to other disadvantages, notably a hardness of the pigment which makes it relatively difficult to grind into organic vehicles as in making inks, varnishes, and the like.

According to the present invention we have found that much softer pigments of the porphine series, and particularly phthalocyanine pigments, can be prepared if the precipitation from sulfuric acid solution is effected in the presence of a water-immiscible organic liquid. The water-immiscible liquid is substantially removed from the pigment in the process and appears to exert its action during precipitation. However, it is not desired to limit the present invention to any particular theory of action.

The process of the present invention should not be confused with certain processes in which sulfonated organic compounds have been used in acid pasting in the form of wetting agents which are retained in the pigment and increase its wettability. Such wetting agents are sulfonated alkylated naphthalene, sulfonated dinaphthyl methane, and the like, and they are not water-immiscible organic liquids and hence do not perform the function of the present invention and such procedures are not included.

The present invention is not limited to any particular water-immiscible organic liquid and in general a wide variety of immiscible liquids may be used, some of whch are soluble in sulfuric acid and some of which are not. While the invention is not limited broadly to any particular organic liquid, different liquids give varying results with different pigments and in each case the optimum should be chosen. Improved results are generally obtained with any suitable organic liquids.

The present invention is not limited to the introduction of the organic liquid at any particular stage of the acid pasting. Thus, for example, in the case of organic liquids which are soluble in concentrated sulfuric acid and which are not sulfonated such as nitrobenzene, symmetrical tetrachlorethane and the like, they may be added to the sulfuric acid solution prior to dilution. In the case of other organic liquids which are subject to sulfonation it is preferable to disperse the organic liquid with the water or dilute sulfuric acid which is used to precipitate the pigment. Without intending to limit the present invention, some typical organic liquids in addition to nitrobenzene are the following: homologues of benzene such as toluene, xylene, p-cymene, mesitylene, turpentine, Solvesso #2, an essentially aromatic petroleum hydrocarbon fraction; mixed hexanes; esters such as amylbutyrate, amylsalicylate, amylsilicate; ethers such as amyl benzyl ether, diamylether, dibutylether, diphenylether, n-butylphenyl ether; aliphatic halogen compounds such as carbon tetrachloride and symmetrical tetrachloroethane and the like. It will be apparent that all the above-listed typical organic liquids operative in the process of the present invention are neutral, that is, they contain no basic or acidic groups.

While the present invention as stated above is not limited to any particular water-immiscible organic liquid, we have found that substituted benzene hydrocarbons give the best results with the commercially most important phthalocyanine pigments such as copper phthalocyanine. Toluene is much better than benzene and xylene is still better. When longer chain hydrocarbons are used the improvement over xylene is not great and therefore because of its cheapness xylene may be considered as the preferred compromise between maximum effectiveness and lowest cost.

The amount of the immiscible organic liquid may vary depending upon the liquid but for best results it should be at least approximately 20% of the weight of the pigment. The effectiveness drops off rather sharply with smaller amounts, although the invention is not limited to the use of as large a proportion of immiscible liquid as 20%, this constituting a preferred embodiment.

The porphine pigments suitable for treatment by the present invention are naturally limited to those which are capable of solution in strong or concentrated sulfuric acid without decomposition.

As far as metal derivatives of phthalocyanine (tetrabenzo tetrazaporphine) itself are concerned, it is known that, e. g., the copper, zinc, iron, cobalt, nickel complexes are stable to sulfuric acid; therefore they may be subjected to our procedure. Not only phthalocyanine itself and its stable metal compounds may be used, but also other tetrazaporphines and their stable metal derivatives, such as, e. g., tetranaphtho tetraza-prophines, alkyl and aryl derivatives of phthalocyanine, halogenated phthalocyanines, tetraza-porphines with fused heterocyclic rings, and the like. Also tetrabenzo-porphine, tetrabenzo triaza-porphine and similar compounds and their sulfuric-acid-stable metal complexes may be subjected to our process.

The drawings show the curves of strength plotted against number of mulls.

The invention will be described in greater detail in conjunction with the following examples, but it is not limited to the details thereof. The parts are by weight.

EXAMPLE 1

1 part of copper phthalocyanine, which may be a crude or a pure product, is dissolved in 14 parts of 95% sulfuric acid at 60–65°. Then a water-immiscible organic liquid which is not sulfonated under these conditions is added in the amount given in the table below, while the temperature is kept at the same range. In many cases where the organic liquid dissolves in the sulfuric acid solution this is simply run on to the surface of 100 parts of ice water containing enough ice so that the temperature remains below 30°. In cases where the organic liquid does not dissolve, the sulfuric acid mixture has to be agitated while it is run onto the ice water. In either case the addition should take place slowly, preferably through a spraying device, and the ice water should be well stirred. The precipitated pigment is washed by decantation to a neutral reaction or until only slightly acid to Congo red paper. If acid the acidity is neutralized with caustic soda solution and then caustic alkali or soda ash is added to give ½% solution and the organic liquid is stripped off by steam. The pigment obtained is filtered, washed salt free and dried at 60–70°.

Following this formula the following organic liquids have been used: dibutylether, diamylether, diphenylether, nitrobenzene. These liquids dissolve in the sulfuric acid either as such or as oxonium sulfates.

In order to express the softness numerically, a softness test was used which is standard with the A. S. T. M. (see A. S. T. M. Standards 1939 Part II, pages 660–663). The muller used was a standard glass muller three inches in diameter, weighed with a 16 pound lead weight and details of carrying out the test are as follows:

0.500 gram of pigment was mixed with 1.250 grams of No. 1 transparent lithographic varnish with a palette knife, and ground with a weighed (16 pounds) 3 inch glass muller a specified number of full double strokes, or mulls, gathering every 25 mulls.

In this manner inks ground to 25, 50, 100, 150, 200 and 300 strokes were obtained. These inks were diluted with white ink without further mulling and their strengths compared.

The softness of the pigments precipitated with the above immiscible liquids added to the pigment-acid solution is shown by the following table.

Table I

| Organic liquid added to pigment-acid solution | Ratio of liquid to pigment | Per cent strength at the following number of mulls | | | | | | Comparison vs. standard at 300 mulls | |
|---|---|---|---|---|---|---|---|---|---|
| | | 25 | 50 | 100 | 150 | 200 | 300 | Per cent strength | Shade |
| None (standard) | | 23 | 43 | 61 | 72 | 81 | 100 | 100 | Type. |
| Dibutyl ether | 1:1 | 95 | 98 | 99 | 100 | 100 | 100 | 154 | Brighter. |
| Diamyl ether | 0.5:1 | 90 | 93 | 96 | 99 | 100 | 100 | 148 | Do. |
| Do | 2:1 | 82 | 86 | 96 | 97 | 98 | 100 | 150 | Do. |
| Diphenyl oxide | 1.5:1 | 40 | 64 | 84 | 94 | 98 | 100 | 138 | Do. |
| Mono-nitrobenzene | 0.3:1 | 52 | 72 | 87 | 89 | 99 | 100 | 147 | Sl. brighter. |

The strength in percentage of type of the best proportions of each material is plotted in curve form in Figure 1 of the drawings.

EXAMPLE 2

Copper phthalocyanine is treated as in Example 1 the only difference being that the water-immiscible organic liquid is added to the ice water used for the precipitation with rapid stirring so that an emulsion of the organic liquid in the ice water results.

Organic liquids that have been used in this procedure comprise, e. g., homologues of benzene such as toluene, xylenes, and p-cymene, turpentine, the solvent known under the name "Solvesso #2," (a petroleum fraction predominantly aromatic, B. R. 135–190° C.), hexanes, nitrobenzene; esters such as amylbutyrate, and diamyl maleate; ethers such as diamylether, dibutylether, diphenylether; aliphatic halogen compounds such as carbon tetrachloride and symmetrical tetrachloroethane and the like.

The softness of the pigments when tested by the softness test, as explained in Example 1, are shown in the following table.

Table II

| Organic solvent in water | Ratio of solvent to pigment | Percent maximum strength at the following number of mulls | | | | | | Comparison vs. standard at 300 mulls | |
|---|---|---|---|---|---|---|---|---|---|
| | | 25 | 50 | 100 | 150 | 200 | 300 | Percent strength | Shade |
| None (standard) | | 23 | 43 | 61 | 72 | 81 | 100 | 100 | Type. |
| Mixed xylenes | 2:1 | 82 | 94 | 97 | 98 | 99 | 100 | 146 | Brighter. |
| Do | 6:1 | 94 | 95 | 96 | 99 | 100 | 100 | 123 | Do. |
| o-Xylene | 1.5:1 | 89 | 94 | 95 | 97 | 99 | 100 | 148 | Do. |
| m-Xylene | 1.5:1 | 86 | 92 | 95 | 96 | 97 | 100 | 130 | Do. |
| p-Xylene | 1.5:1 | 91 | 93 | 94 | 97 | 98 | 100 | 130 | Do. |
| p-Cymene | 2:1 | 90 | 95 | 99 | 99 | 99 | 100 | 145 | Do. |
| Diamyl maleate | 0.5:1 | 83 | 91 | 93 | 95 | 96 | 100 | 130 | Do. |
| Amyl butyrate | 0.5:1 | 79 | 89 | 95 | 98 | 99 | 100 | 154 | Do. |
| Dibutyl ether | 1.5:1 | 75 | 90 | 94 | 96 | 99 | 100 | 140 | Do. |
| Carbon tetrachloride | 1.5:1 | 60 | 80 | 86 | 92 | 94 | 100 | 135 | Do. |
| Acetylene tetrachloride | 1.5:1 | 91 | 94 | 99 | 99 | 100 | 100 | 146 | Do. |
| Solvesso #2 | 1.5:1 | 59 | 79 | 94 | 98 | 99 | 100 | 146 | Do. |
| Turpentine | 0.5:1 | 75 | 85 | 98 | 96 | 98 | 100 | 146 | Sl. brighter. |

The strength in percentage of type of the best proportions of each material is plotted in curve form in Figures 2 and 3 of the drawings.

We claim:

1. A process of producing porphine pigments of enhanced softness and strength which comprises dissolving a porphine pigment in concentrated sulfuric acid, diluting the same with an aqueous medium in the presence of a water-immiscible neutral organic liquid, and subsequently removing said water-immiscible neutral organic liquid from the pigment by physical means.

2. A process of producing porphine pigments of enhanced softness and strength which comprises dissolvinbg tetraza-porphine pigments in concentrated sulfuric acid, diluting the same with an aqueous medium in the presence of a water-immiscible neutral organic liquid, and subsequently removing said water-immiscible neutral organic liquid from the pigment by physical means.

3. A process of producing porphine pigments of enhanced softness and strength which comprises dissolving a porphine pigment of the phthalocyanine series in concentrated sulfuric acid, diluting the same with an aqueous medium in the presence of a water-immiscible neutral organic liquid, and subsequently removing said water-immiscible neutral organic liquid from the pigment by physical means.

4. A process of producing porphine pigments of enhanced softness and strength which comprises dissolving a copper phthalocyanine pigment in concentrated sulfuric acid, diluting the same with an aqueous medium in the presence of a water-immiscible neutral organic liquid, and subsequently removing said water-immiscible neutral organic liquid from the pigment by physical means.

5. A process of producing porphine pigments of enhanced softness and strength which comprises dissolving a porphine pigment in concentrated sulfuric acid, diluting the same with an aqueous medium in the presence of an amount of water-immiscible neutral organic liquid equal to at least 20% of the weight of the pigment, and subsequently removing said water-immiscible neutral organic liquid from the pigment by physical means.

6. A process of producing porphine pigments of enhanced softness and strength which comprises dissolving tetraza-porphine pigments in concentrated sulfuric acid, diluting the same with an aqueous medium in the presence of an amount of water-immiscible neutral organic liquid equal to at least 20% of the weight of the pigment, and subsequently removing said water-immiscible neutral organic liquid from the pigment by physical means.

7. A process of producing porphine pigments of enhanced softness and strength which comprises dissolving a porphine pigment of the phthalocyanine series in concentrated sulfuric acid, diluting the same with an aqueous meduim in the presence of an amount of water-immiscible neutral organic liquid equal to at least 20% of the weight of the pigment, and subsequently removing said water-immiscible neutral organic liquid from the pigment by physical means.

8. A process of producing porphine pigments of enhanced softness and strength which comprises dissolving a copper phthalocyanine pigment in concentrated sulfuric acid, diluting the same with an aqueous medium in the presence of an amount of water-immiscible neutral organic liquid equal to at least 20% of the weight of the pigment, and subsequently removing said water-immiscible neutral organic liquid from the pigment by physical means.

9. A method according to claim 1 in which the liquid is an aromatic hyrocarbon.

10. A method according to claim 4 in which the liquid is an aromatic hydrocarbon.

11. A method according to claim 1 in which the liquid is an ether.

12. A method according to claim 4 in which the liquid is an ether.

13. A method according to claim 1 in which the liquid is a chlorinated aliphatic hydrocarbon.

14. A method according to claim 4 in which the liquid is a chlorinated aliphatic hydrocarbon.

15. A method according to claim 4 in which the liquid is mixed xylenes.

16. A method according to claim 1 in which the organic liquid is removed by steam distillation.

17. A method according to claim 4 in which the organic liquid is removed by steam distillation.

18. A method according to claim 1 in which the organic liquid is removed by steam distillation in the presence of an alkali.

19. A method according to claim 4 in which the organic liquid is removed by steam distillation in the presence of an alkali.

20. A process of producing porphine pigments of enhanced softness and strength which comprises dissolving a porphine pigment in concentrated sulfuric acid, diluting the same with an aqueous medium in the presence of a volatilizable water-immiscible neutral organic liquid, and subsequently removing said volatilizable water-immiscible neutral organic liquid from the pigment by volatilization.

HAROLD TALBOT LACEY.
HANS Z. LECHER.